United States Patent Office 3,662,035
Patented May 9, 1972

3,662,035
MONOPHOSPHORIC ACID ESTERS OF
HALOGENATED BIPHENOL
Samuel Van der Meer, Amstelveen, Willem Kruyt, Haarlem, and Hendrik Pouwels, Amsterdam, Netherlands, assignors to ACF Chemiefarma N.V., Amsterdam, Netherlands
No Drawing. Original application Apr. 28, 1966, Ser. No. 545,890, now Patent No. 3,482,016, dated Dec. 2, 1969. Divided and this application May 12, 1969, Ser. No. 841,658
Int. Cl. C07d *105/04;* C07f *9/12;* A01n *9/36*
U.S. Cl. 260—953
2 Claims

ABSTRACT OF THE DISCLOSURE

Monophosphoric acid esters of a biphenol of the formula

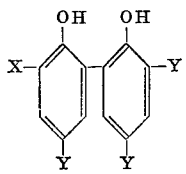

wherein X is H or halogen and Y is halogen. The compounds have utility as antiparasitics.

---

This is a division of application Ser. No. 545,890, filed Apr. 28, 1966, and which issued on Dec. 2, 1969 as U.S. Pat. No. 3,482,016.

The present invention relates generally to new antiparasitic compositions, to new compounds contained in such compositions, to methods for preparing these compositions and compounds, and to methods for combating internal parasites, particularly the liver-fluke (*Fasciola hepatica*).

Fascioliasis, liver rot, or liver-fluke infection is a disease from which sheep and cattle particularly suffer, but by which other warm-blooded animals and even man may also be affected. The disease is caused by the liver-fluke (*Fasciola hepatica*), a parasite thriving in the liver and the biliary ducts of the infected beings and there causing damage by which the normal function of these organs is disturbed. The after-effect is a more or less serious decline in the general condition of the animals, which may even lead to their death.

For combating this disease some new means have been suggested during the past few years, for example hexachlorophene or 2,2'-methylenebis(3,4,6-trichlorophenol) and mofochlofeen or the monophosphoric acid ester of hexachlorophene (which has been disclosed in British patent specification No. 1,001,229). Although these new means have several advantages over the drugs previously used against fascioliasis, they are still susceptible of improvement, particularly as regards their toxicity.

According to this invention, it has been found that biphenols of the formula

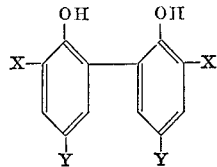

in which X represents hydrogen or halogen and Y represents halogen, possess a pronounced activity against fascioliasis, and that most of the compounds included in the general formula show a comparatively low toxicity. Especially suitable are the compounds in which the halogen atoms have an atomic weight between 35 and 81.

It has further been found that the above compounds can be converted into their monophosphoric acid esters and physiologically acceptable salts thereof which possess also a pronounced activity against fascioliasis and, moreover, have better solubility properties. This is an advantage in working up the compounds into pharmaceutical compositions and in applying them, especially in the treatment of sheep.

Some of the biphenols according to the above formula are known, as such, but not as remedies for fascioliasis. Specifically, compounds in which X represents hydrogen and Y represents chlorine or bromine, and compounds in which X and Y both represent either chlorine or bromine have been mentioned in the U.S. Pat. No. 2,487,799 and also in a paper by Paul B. Marsh et al., Ind. Eng. Chem. 38, 701 (1946). The compound in which both X and Y represent chlorine has also been mentioned in an article by K. Okazaki et al., J. Pharm. Soc. Japan 72, 1403 (1952). The compound in which X represents chlorine and Y represents bromine has been mentioned in a publication by Ph. W. Robertson et al., J. Chem. Soc. 101, 1973 (1912), but that publication is very disputable and it is seriously doubted whether the authors did, in fact, obtain the described compound. The biphenols not mentioned in the preceding paragraph and the phosphoric acid esters of all the biphenols according to the above formula are new. They can be prepared by methods known per se for analogous compounds. Thus, the unknown biphenols can be prepared by halogenation of known compounds.

The monophosphoric acid esters can be prepared by a simple method that involves treating the biphenol with phosphoryl chloride and hydrolyzing the cyclic phosphorochloridate thus obtained, through the cyclic phosphate, into the monophosphoric acid ester according to the invention. This method has been described for the production of the monophosphoric acid ester of hexachlorophene in the British patent specification 1,001,229 mentioned before. However, in preparing the monophosphoric acid esters according to the invention it has been found that considerably better results than those described in this British specification can be obtained if the conversion of the biphenol with phosphoryl chloride is carried out in the presence of pyridine. The cyclic phosphates mentioned above as intermediates in preparing the monophosphoric acid esters are also new compounds, and can be isolated if desired.

It has been found that the alkali metal salts of the new monophosphoric acid esters are particularly useful in combating liver-fluke infection in sheep because of their relatively good solubility in water at a physiologically acceptable pH.

For the preparation of antiparasitic compositions according to the invention, the active components have to be made into suitable administration forms such as tablets, pills, capsules, potions. For that purpose, the active component can be mixed with the usual pharmaceutical carriers as talc, magnesium stearate, amylum, lactose and physiologically acceptable solvents.

Particularly useful for the treatment of fascioliasis are tablets containing, in addition to the monophosphoric acid ester of the biphenol, one equivalent of sodium hydrogen carbonate. It is also possible of course to mix the active components with feed or feed ingredients and to administer the drug in this way.

It has been found that, in general, a single dose of about 10 to about 30 mg. per kg. of animal weight is suitable to cause a very satisfactory and long-lasting reduction in the number of eggs present in the faeces of infected animals. It has further been found that said dose generally kills all mature liver-flukes in experimental animals.

The above discussion of methods for the preparation of compounds according to the invention and of antiparasitic preparations containing them, as well as the following examples which further specify these general methods, are not to be construed as limiting the invention to the particular method, compound or preparation described.

EXAMPLE I

Approximately 6.5 grams of 4,4',6,6'-tetrachloro-o,o'-biphenol are dissolved in 40 ml. of 1 N sodium hydroxide and water is added to provide a total solution of 325 ml. The solution obtained can be administered to animals for combating fascioliasis.

EXAMPLE II 1.6 grams of 4,4',6,6'-tetrabromo-o,o'-biphenol are dissolved, while stirring and heating on a steam bath, in 10 ml. of Mulgofen E L-719 (a mixture of polyethylene ethers of hydroxy fatty acids). Thereupon, water is added to provide a total solution of 80 ml. The solution obtained can be administered to animals for combating fascioliasis.

EXAMPLE III

A mixture of 4.2 grams of the monophosphoric acid ester of 4,4'-dibromo-o,o'-biphenol and 2.1 grams of sodium hydrogen carbonate is dissolved in 150 ml. of water. The solution obtained can be used in combating fascioliasis.

EXAMPLE IV

A mixture of 810 grams of 4,4',6,6'-tetrabromo-o,o'-biphenol, 2770 grams of lactose and 120 grams of polyvinylpyrrolidone is granulated in the usual way. Thereupon, 400 grams of sodium hydrogen carbonate, 140 grams of powdered talc, 70 grams of sodium stearate and 190 grams of maize starch are added. The mixture is worked up in the usual way into 1000 oblong tablets of 4.5 grams each.

EXAMPLE V

To a solution of 172 grams (0.5 mole) of 4,4'-dibromo-o,o'-biphenol in 1250 ml. of glacial acetic acid are added, all at once, 120 ml. (1.5 moles) of sulphuryl chloride. The temperature is kept below 35° C. by cooling. After the evolution of heat has ceased, the mixture is still kept at 35° C. for 75 minutes. After cooling, the crystals formed are filtered. The mother liquor is diluted with water yielding more final product. The 4,4'-dibromo-6,6'-dichloro-o,o'-biphenol obtained melts at 184–185° C. Yield: 99%.

EXAMPLE VI

A mixture of 100.4 grams (0.2 mole- of 4,4',6,6'-tetrabromo-o,o'-biphenol, 370 ml. of phosphoryl chloride (4 moles) and 10 ml. of pyridine is refluxed for 14 hours, whereupon the excess of phosphoryl chloride is removed carefully by evaporation under reduced pressure. The residue is boiled for 15 minutes with 1.8 l. of water and 1 l. of 1 N sodium hydroxide. Thereupon, 200 ml. of 10 N sodium hydroxide are added and boiling is continued for 2 hours.

After cooling, 300 ml. of concentrated hydrochloric acid are added while stirring, and the solution obtained is extracted with ethyl acetate. The solvent is removed in vacuo, yielding the monophosphoric acid ester of 4,4', 6,6'-tetrabromo-o,o'-biphenol.

The product obtained may be further purified by dissolving the same in 500 ml. of ethyl acetate, extracting this solution with 400 ml. of water containing 16.8 grams of sodium hydrogen carbonate, acidifying the aqueous layer, extracting the same again with ethyl acetate, and finally removing the solvent in vacuo. Yield: 85%.

EXAMPLE VII

In a similar way as described in Example VI, however, starting from the corresponding biphenol, the monophosphoric acid ester of 4,4',6,6'-tetrachloro-o,o'-biphenol is prepared. The product is obtained in such a pure state that the additional purification described in the preceding example, is superfluous. Yield: 95%.

EXAMPLE VIII

In a similar way as described in Example VII, the monophosphoric acid ester of 4,4'-dibromo-o,o'-biphenol is prepared. Yield: 98%.

EXAMPLE IX

In a similar way as described in Example VII, the monophosphoric acid ester of 4,,4'-dibromo-6,6'-dichloro-o,o'-biphenol is prepared. Yield: 99%.

The purity of the monophosphoric acid esters obtained according to Examples VI through IX is checked by means of potentiometric titration.

EXAMPLE X

Rats, in which liver-flukes are implanted subcutaneously, are treated with a single dose of the compounds according to the present invention. Three days after treatment the percentage of killed liver-flukes is determined. Some test-animals are not treated in order to serve as controls. The method used is analogous to that described by E. Lienert, Exp. Parasitol. 10, 223 (1960).

The results obtained as summarized in the following table:

|  | Percentage of killed liver-flukes | | | |
| --- | --- | --- | --- | --- |
|  | Dosage | | | |
| Compounds administered | 5 mg./kg. | 10 mg./kg. | 20 mg./kg. | Controls |
| Biphenols according to the general formula in which— | | | | |
| 1 (X=Cl, Y=Cl) | 60 | 93 |  | 12 |
| 2 (X=Br, Y=Br) | 57 | 59 | 94 | 14 |
| 3 (X=Cl, Y=Br) | 48 | 76 |  | 17 |
| 4 Monophosph. acid est. of 2 | 64 | 97 |  | 12 |
| 5 Monophosph. acid est. of 3 | 52 | 71 |  | 11 |

EXAMPLE XI

Fourteen sheep of which the faeces contain considerable amounts of liver-fluke eggs and which are consequently strongly affected with fascioliasis, are treated with oblong tablets prepared according to Example IV. The individual single dosage amounts to 20 mg./kg. weight. One, two and three weeks after treatment the faeces of the animals are tested again for the occurrence of liver-fluke eggs therein. It appears that the excretion of such eggs has completely stopped.

EXAMPLE XII

A sheep, the faeces of which contain 20 liver-fluke eggs per gram, is treated with a single dose of 28 mg./kg. of the monophosphoric acid ester of 4,4'-dibromo-o,o'-biphenol in the form of a solution prepared according to Example III. Two weeks after treatment the faeces of the sheep are free from eggs of the parasite.

EXAMPLE XIII

Twelve sheep, the faeces of which contain on an average 73 liver-fluke eggs per gram, are treated each with a single dose of 20 mg./kg. of 4,4'-dibromo-6,6'-dichloro-o,o'-biphenol in the form of a solution and analogous to that described in Example I. Two, three and four weeks after treatment, the faeces of the sheep are free from eggs of the parasite.

EXAMPLE XIV

A mixture of 580 grams of the monophosphoric acid ester of 4,4',6,6'-tetrabromo-o,o'-biphenol, 3000 grams of lactose and 120 grams of polyvinylpyrrolidone is granulated in the usual way. Thereupon 300 grams of sodium hydrogen carbonate, 140 grams of powdered talc, 70 grams of sodium stearate and 290 grams of maize starch are added. The mixture is worked up in the usual way into 1000 oblong tablets of 4.5 grams each.

EXAMPLE XV

Fifteen sheep, the faeces of which contain considerable amounts of liver-fluke eggs and which are consequently strongly affected with fascioliasis, are treated with oblong tablets prepared according to Example XIV. The individual single dosage amounts to 16 mg./kg. body weight. Two and three weeks after treatment the faeces of the animals are tested again for the occurrence of liver-fluke eggs therein. It appears that the excretion of such eggs has completely stopped.

What is claimed is:
1. A compound selected from the group consisting of a monophosphoric acid ester of a biphenol of the formula

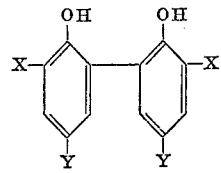

in which X is selected from the group consisting of hydrogen and halogen having an atomic weight between approximately 35 to 81, and Y represents halogen having an atomic weight between approximately 35 to 81, and physiologically acceptable alkali metal salts of said ester.

2. A compound selected from the group consisting of the monophosphoric acid ester of 4,4',6,6'-tetrabromo-o,o'-biphenol, and the physiologically acceptable alkali metal salts of said ester.

References Cited

UNITED STATES PATENTS 3,439,069   4/1969   Van Der Meer et al. __ 260—953

JOSEPH REBOLD, Primary Examiner

A. H. SUTTO, Assistant Examiner

U.S. Cl. X.R.

260—936, 974, 983